H. K. McCLURE.
TROLLEY WHEEL.
APPLICATION FILED JUNE 7, 1915.
1,178,249.
Patented Apr. 4, 1916.
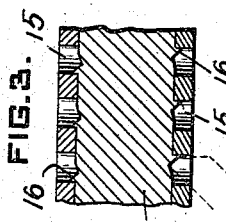
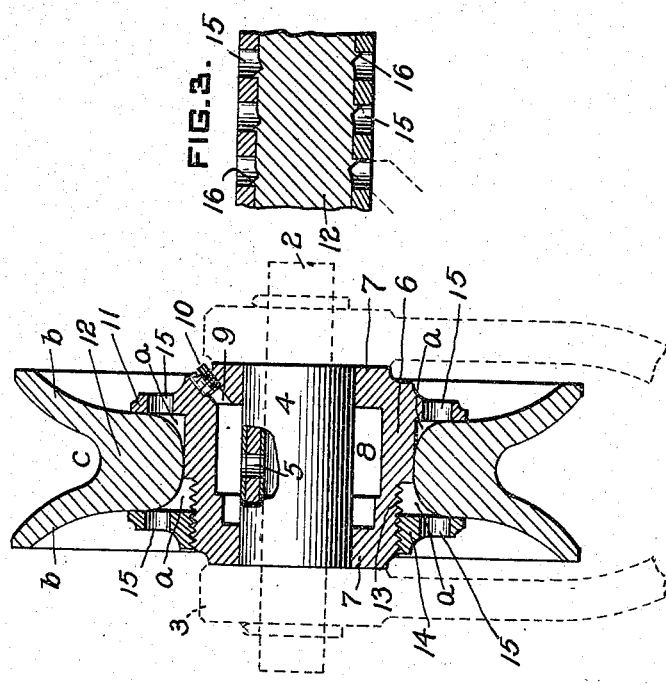
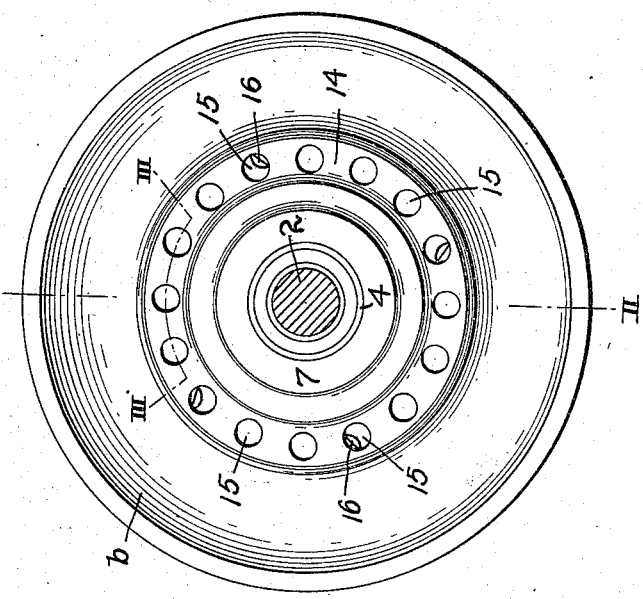
WITNESSES
J. Herbert Bradley.
W. A. Heckman
Harry K. McClure INVENTOR.
by T. C. M. Clarke
his ATTORNEY

UNITED STATES PATENT OFFICE.

HARRY K. McCLURE, OF ELK LICK, PENNSYLVANIA.

TROLLEY-WHEEL.

1,178,249.  Specification of Letters Patent.  Patented Apr. 4, 1916.

Application filed June 7, 1915. Serial No. 32,510.

*To all whom it may concern:*

Be it known that I, HARRY K. MCCLURE, a citizen of the United States, residing at Elk Lick, in the county of Somerset and State of Pennsylvania, have invented certain new and useful Improvements in Trolley-Wheels, of which the following is a specification.

My invention relates to an improvement in trolley wheels for street car and other service, in providing a rolling conductor between the trolley wire and the motor.

It has for its object to provide a wheel of such type in which the wearing or contacting element is so constructed and mounted, in connection with and relation to the mounting or hub member, as to provide for easy removal and renewal, thus effecting a very considerable saving in material, avoiding the usual necessity of replacing a worn wheel with an entirely new one, and providing for simple efficient construction and operation.

One preferred construction of the invention is illustrated in the accompanying drawings, in which—

Figure 1 is a view of the wheel and its hub member in side elevation. Fig. 2 is a vertical sectional view on the line II. II. of Fig. 1, indicating the supporting harp and spindle in dotted lines. Fig. 3 is a sectional detail view, on the line III. III. of Fig. 1.

In the drawings, the entire revoluble wheel structure is mounted to revolve around a supporting central spindle 2, which by its outer ends is carried in the usual terminals of a supporting harp 3, indicated in dotted lines. The spindle, which is usually a cylindrical stud of suitable strength and conducting material, is carried in the harp by cotters or other suitable means, and is provided between the harp terminals with an embracing bushing 4 of suitable material, as bronze, copper, etc., adapted to provide a surrounding bearing for the revoluble hub member or members of the wheel. Bushing 4 is provided at its middle portion with one or more transverse lubricant conducting openings 5 communicating at the outside with the lubricant reservoir of the hub, and at the inside with the spindle.

The hub members comprise a main hub 6 having an axial transverse cylindrical opening embracing the bushing 4 for easy rotation thereon at each side of its central portion, adjacent the inner faces of the embracing harp arms. Hub 6 extends co-extensive with said bushing from one end to the other between the harp terminals, having outermost bearing portions 7, 7, between which is the enlarged annular cavity 8 for lubricant of any suitable kind. At any convenient point, a port 9, having a closing stop 10, provides for application of the lubricant to said cavity. Hub 6 is provided at one side with an integral flange 11, extending laterally and adapted to embrace one side of the removable wheel 12. At its other side, the hub 6 is provided with a reduced diameter having threads 13, upon which is screwed the companion flange nut 14, corresponding in design and shape to the integral flange 11. The unthreaded middle portion of hub 6 preferably extends sufficiently beyond the central operating or conductor wire engaging plane of wheel 12 to provide a good bearing for the inner edge of the wheel, which is rounded, as shown, in substantially semicircular form, providing at each side of such middle bearing portion an annular air space or ventilation cavity *a*. Beyond such inner rounded portion the sides *b*, *b*, of the wheel extend divergently, providing the intervening usual groove *c* for engagement with the trolley wire. By this means the trolley wheel is fixedly clamped between the annular inner corner edges of flange 11 and flange nut 14 respectively, and in mounted position on the barrel 6. Each of said members 11 and 14 is provided with an annular series of perforating openings 15 adapted to provide for engagement thereby by a suitable spanner or wrenching tool, whereby to turn up the flange nut 14 on thread 13 of hub 6, and to hold said hub during such operation.

Openings 15, which are preferably as numerous and closely adjacent as they may be practicably arranged, are preferably circular, as shown, and provide for ample air circulation and ventilation of the central hub portion of the structure and annular cavities *a*. This feature is one of especial advantage in keeping the wheel cool. A further advantage is that the metal of wheel 12, which is comparatively soft, as copper, bronze, or such compositions as are usually used for trolley wheels, may be easily struck up by the insertion of a suitable tool through openings 15, to provide retaining abutments or interlocking projections 16 at intervals, engaging against the inner edge of openings 15, whereby to positively lock the flange nut 14 or hub 6 against reverse rotation and resulting loosening. Such struck up abutments, while amply sufficient to prevent any such loosening, operating in the nature of nut locks, may however be easily sheared off by applying sufficient reverse power to nut 14 or hub 6, in taking the device apart for renewal of the wheel 12. By this construction, it will be seen that the main body portion of the wheel comprises the rotatable hub and its coöperating flange nut, which as thus arranged, are subject to no wear whatever, and are practically indestructible. The contacting current-conveying wheel 12, which does rapidly wear and require frequent replacement, is comparatively small and light, and capable of being easily mounted in the hub and of being removed by replacement by a new wheel when worn or damaged.

The wheel as thus made practically requires no finishing whatever, except possible smoothing of the groove c, and is otherwise capable of being molded or cast or otherwise made in finished form. The construction thus provides for great simplicity, cheapness and efficiency; the parts, other than the renewable wheel, are continuously durable; and the construction provides for high efficiency as to conductivity of current, ample lubrication, and avoids the complications, disadvantages and expense of constructions requiring complete renewal as to the entire trolley wheel.

The advantages of the invention will be readily appreciated by all those familiar with this class of device.

While the invention is shown as particularly embodied with a grooved trolley wheel, it will be understood that it may be utilized with any form or arrangement of contacting wheel and of variously different proportions, design, or construction by the skilled mechanic, but all such changes are to be considered as within the scope of the following claims.

What I claim is:

1. A trolley wheel comprising a hub member adapted to be rotatably mounted on a supporting bearing having a lateral annular retaining flange at one side and an opposite threaded terminal, a trolley wheel mounted on the middle portion of said hub member, and a flange nut screwed on said threaded terminal tightly embracing the trolley wheel and clamping it against the opposite retaining flange.

2. A trolley wheel comprising a hub member adapted to be rotatably mounted on a supporting bearing having a lateral annular retaining flange at one side and an opposite threaded terminal, a trolley wheel mounted on the middle portion of said hub member having an internal transversely rounded centrally open co-acting hub portion, and a flange nut screwed on said threaded terminal tightly embracing the trolley wheel and clamping it against the opposite retaining flange.

3. A trolley wheel comprising separable hub members having embracing flange portions, and a peripherally grooved wheel having an internal transversely rounded co-acting hub portion embraced thereby providing annular circulation spaces at each side between said hub portion and said flange portions.

4. A trolley wheel comprising separable hub members having embracing flange portions provided with perforating spanner openings, and a peripherally grooved wheel having a centrally open hub portion embraced thereby.

5. A trolley wheel comprising separable hub members having embracing flange portions provided with perforating spanner openings, and a peripherally grooved wheel having a centrally open transversely rounded hub portion embraced thereby and providing intervening annular air circulation cavities communicating with said spanner openings.

6. A trolley wheel comprising separable hub members in threaded engagement having embracing flange portions provided with means for holding or turning one of said hub members with relation to the other, and a peripherally grooved wheel having a centrally open hub portion embraced thereby.

7. A trolley wheel consisting of a main hub member adapted to be rotatably mounted on a supporting bearing having a central annular barrel, a lateral annular retaining flange at one side, and a threaded terminal at the other side, a trolley wheel mounted on said barrel, and a flange nut screwed on said threaded terminal tightly embracing the trolley wheel and clamping it against the opposite retaining flange.

8. The combination with the harp, spindle and bushing; of a hub rotatably mounted on the bushing having a central annular barrel, a lateral annular retaining flange at one side and a threaded terminal at the other side, a trolley wheel mounted on said barrel, and a flange nut screwed on said threaded terminal tightly embracing the trolley wheel and clamping it against the opposite retaining flange.

9. The combination with the harp, spindle and bushing; of a hub rotatably mounted on the bushing having a central annular barrel, a lateral annular retaining flange at one side having an annular series of perforating openings, and a threaded terminal at the other side, a trolley wheel mounted on said barrel, and a flange nut having a similar series of perforating openings screwed on said threaded terminal tightly embracing the trolley wheel and clamping it against the opposite retaining flange.

10. The combination with the harp, spindle and bushing; of a hub rotatably mounted on the bushing having a central annular barrel, a lateral annular retaining flange at one side having an annular series of perforating openings, and a threaded terminal at the other side, a trolley wheel mounted on said barrel having an inner annular transversely rounded rim engaging the middle portion of the barrel and providing at each side thereof an annular air space, and a flange nut having a similar series of perforating openings screwed on said threaded terminal tightly embracing the trolley wheel and clamping it against the opposite retaining flange.

11. The combination with the harp, spindle, and perforated bushing; of a hub rotatably mounted on the bushing having a central annular barrel, an inner annular lubricant cavity between endmost bearing portions, a supply opening leading thereto, a lateral annular retaining flange at one side having an annular series of perforating openings, and a threaded terminal at the other side, a trolley wheel mounted on said barrel having an inner annular transversely rounded rim engaging the middle portion of the barrel and providing at each side thereof an annular air space, and a flange nut having a similar series of perforating openings screwed on said threaded terminal tightly embracing the trolley wheel and clamping it against the opposite retaining flange.

12. The combination with the harp, spindle, and perforated bushing; of a hub rotatably mounted on the bushing having a central annular barrel, an inner annular lubricant cavity between endmost bearing portions, a supply opening leading thereto, a lateral annular retaining flange at one side having an annular series of perforating openings, and a threaded terminal at the other side, a trolley wheel mounted on said barrel having an inner annular transversely rounded rim engaging the middle portion of the barrel and providing at each side thereof an annular air space, and a flange nut having a similar series of perforating openings screwed on said threaded terminal tightly embracing the trolley wheel and clamping it against the opposite retaining flange and integral struck-up lugs extending from the trolley wheel into said perforating openings and providing retaining abutments adapted to prevent unscrewing of the hub members.

In testimony whereof I hereunto affix my signature in the presence of two witnesses.

HARRY K. McCLURE.

Witnesses:
W. A. HECKMAN,
C. M. CLARKE.